// Nov. 17, 1964     V. NORMAN ET AL     3,157,531
PROCESS FOR THE MANUFACTURE OF CARBONACEOUS SOLID BODIES
Filed Jan. 21, 1960

INVENTORS
VELLO NORMAN
AND
THOMAS P. WHALEY
BY
ATTORNEY 3,157,531
PROCESS FOR THE MANUFACTURE OF
CARBONACEOUS SOLID BODIES
Vello Norman and Thomas P. Whaley, Baton Rouge, La.,
assignors to Ethyl Corporation, New York, N.Y., a
corporation of Virginia
Filed Jan. 21, 1960, Ser. No. 3,721
2 Claims. (Cl. 117—98)

This invention relates to carbonaceous solid bodies comprising carbon and a metal and to processes for their manufacture. More particularly, this invention relates to heterogeneous solid bodies, comprising carbon and a metal, and to processes for producing these heterogeneous solid bodies from homogeneous carbon solid bodies by decomposition of a metal compound in contact with said carbon solid body.

Modern technology is increasingly calling for materials having a wide range of physical, chemical, electrical and mechanical properties. Carbon materials have long been known to have a wide range of applicability to many diversified processing environments because of their excellent physical, chemical and electrical properties. However, because of their lack of mechanical strength, carbonaceous solid bodies cannot be employed in certain environments where, because of their other properties, such carbonaceous solid materials would, otherwise, be highly desirable.

In the manufacture of carbonaceous solid bodies—particularly graphite carbonaceous solid bodies—it is a well known fact that electrical conductivity and strength is strongly dependent upon the density of the carbonaceous solid body. Thus as density increases conductivity and strength increases. It is therefore highly desirable to produce as dense a solid body as possible. In order to obtain high density it is necessary to resort to elaborate and expensive processing techniques. These techniques involve grinding and milling carbonaceous material, mixing and heating the resultant powders with a carbonaceous binder material; charging this material into a mold or extruder, where the solid shape is produced; thereafter, charging the resultant amorphous carbon containing shapes into a furnace where they are gas baked and then cooled for a period of days, and then transferring the baked shapes into a graphitizing furnace where graphitization takes place. However, even with such elaborate processing techniques, many of the carbon bodies produced contain interstices and other faults which adversely affect the strength of the body and also the electrical properties of the body.

Therefore, one of the foremost objects of this invention is to provide carbonaceous solid bodies having greatly improved mechanical properties by incorporating a metal into the structure of a porous carbon body. Another object is to materially modify in a desirable way the properties of carbonaceous solid bodies through incorporation of a metal therein. A further object of this invention is to provide a process for producing these metal-containing carbonaceous solid bodies. A more specific object is to provide high temperature heterogeneous carbonaceous solid bodies comprising graphite and tungsten wherein the tungsten is integrated into the graphite structure. These and other objects shall appear more fully hereinafter.

Thus, this invention provides a carbonaceous solid body comprising carbon and a metal. In general, the metal is integrated into the carbonaceous solid body to provide a heterogeneous solid body which comprises a porous carbon solid body, wherein the surface of the porous carbon body is covered with a metal coating. A preferred heterogeneous solid body, particularly adapted for high temperature, high mechanical stress applications, comprises a porous graphite solid body, wherein the surface of the porous graphite solid body is covered with a substantially continuous tungsten coating.

Another, and preferred, embodiment within the scope of this invention is a heterogeneous solid body which comprises a porous carbon solid body wherein the interstices of said solid body are impregnated with a metal. These materials have significantly improved thermal and electrical properties.

Another aspect of this invention is a heterogeneous solid body which comprises a porous solid carbon body wherein the interstices of the porous solid carbon body are impregnated with a metal and the outer surface of the porous solid carbon body is covered with a metal coating. In other words, this latter heterogeneous solid body has a metal exterior and an interior comprising a porous solid carbon body impregnated with a metal. Particularly preferred is a heterogeneous solid body comprising a porous solid graphite carbon body, wherein the interstices of said porous solid graphite body are impregnated with tungsten and the outer surface of said porous solid graphite body is covered with a tungsten coating. These heterogeneous solid bodies, which combine impregnation and coating, are a particularly preferred embodiment of this invention, since they have excellent densities and strengths.

The process which so conveniently and economically provides the heterogeneous solid bodies of this invention comprises the decomposition of a metal compound in contact with a porous carbon solid body. By decomposition, as used herein, is meant any technique feasible for decomposing a metal compound. Thus, the term includes decomposition by ultrasonic frequency and decomposition by ultraviolet irradiation, as well as thermal decomposition.

Thermal decomposition is a preferred mode of carrying out the invention. In general, therefore, the products of this invention are provided by a process which comprises the thermal decomposition of a heat decomposable metal compound in contact with a porous carbon solid body. When such thermal techniques are employed, the porous solid carbon body is heated to a temperature above the decomposition temperature of the metal compound—which is preferably a transition metal coordination compound—and said metal compound is contacted with said heated porous carbon solid body. Graphite is generally preferred as the carbon solid body. A particularly preferred process within the scope of this invention comprises heating a porous graphite solid body to a temperature above the decomposition temperature of tungsten carbonyl, or other Group VI-B metal carbonyls, and contacting such carbonyls with the heated graphite solid body.

In designing the heterogeneous solid bodies of this invention, the selection of the metal constituent becomes very important in obtaining the desired properties for a particular use. Thus, although the mechanical properties of carbonaceous solid bodies are generally significantly improved through the incorporation of a metal therein, other properties, such as chemical and electrical properties, are dependent on several factors among which the following are some of the more important; (I) the properties of the metal constituent of the plating agent (i.e., metal containing source of the metal coating), (II) the type of plating agent employed, (III) the technique chosen for incorporating the metal into the carbonaceous body, and (IV) the thickness of the metal coatings.

The metals which comprise the metal constituent of the metal compounds of this invention are, in general, any metals of Groups II–A through V–A, I–B through VII–B, and Group VIII (Periodic Chart of the Elements, Fisher Scientific Company, 1955). The metallic constituents of heterogeneous solid bodies having excellent high temperature characteristics are preferably selected from metals of Groups III–B, IV–B, V–B, VI–B, VII–B, and VIII of the Periodic Chart of the Elements. For high temperature applications, it is especially preferred to employ metals of the aforementioned Groups III–B through VIII having atomic numbers ranging from 21 through 46 and 72 through 78 respectively. (The metals within this latter classification all have melting points substantially above 1,000° C.) If the particular application calls for a metal coating having a low coefficient of thermal expansion, good hardness and excellent corrosion resistance, then the Group VI–B metals are preferred. Molybdenum and tungsten are especially preferred because they possess, in addition to the last mentioned properties, excellent high temperature tensile strengths and melting points of 2600+° C. and 3400° C. respectively.

Magnesium provides a coating which possesses fuel value and has structural strength combined with low density. Scandium provides a light weight metal coating having a high melting point. Scandium can also be coated concurrently with another metal such as titanium to provide a very excellent alloy coating. Titanium coatings provide good corrosion resistance below 500° C. to oxidizing media, are resistant to halogens and inorganic halides, and provide strong interstitial networks within porous heterogeneous solid bodies of this invention. A coating which resists dilute reducing acids and has good elasticity characteristics is vanadium. A very hard and high metallic coat is provided when ruthenium is coated on the solid bodies of this invention. Cobalt also provides a very hard metallic coating. A coating with good mechanical characteristics (ductility, strength and the like) along with good corrosion and oxidation resistance and having value in catalytic uses is nickel. Cadmium and zinc are corrosion resistant coatings. If a light strong coating having good oxidation resistance in oxidizing media is desired, aluminum provides such a coating. Germanium provides a semi-conductor coating.

This invention, therefore, clearly provides an unusually inexpensive and simple technique for producing novel carbonaceous materials, which have thermal, mechanical and electrical properties heretofore unobtainable in carbonaceous materials. As pointed out above, operations commercially in force today go through tedious and expensive processing techniques to achieve density in carbonaceous materials and to impart as great mechanical strength as possible to these materials. However, it is well known that, even after such elaborate, painstaking steps have been undertaken to achieve this greater strength, these carbonaceous materials still fall far short of the necessary mechanical strength to make them reliable in certain processing environments which contain mechanical stress. For example, heat exchangers which are made of carbonaceous materials are extremely susceptible to mechanical shock. Therefore, although these materials are unsurpassed in their thermal conductivity properties, corrosion resistance properties, and other desirable physical and chemical properties, their use is limited because of susceptibility to mechanical shock. Furthermore, these carbonaceous heat exchanger materials are difficult to seal, a shortcoming which results in leakage at their joints. However, the novel heterogeneous solid bodies of this invention overcome these deficiencies by incorporating a metal into prior art carbonaceous materials, said metal being integrated into the carbonaceous structure in the various ways described above. Magnesium, titanium, tungsten, nickel and aluminum are preferred metals for coating of carbonaceous heat exchanger materials—although, in general, any metal having good mechanical characteristics at the temperature of the particular application can be employed. Through this metal integration, the mechanical strength of these materials is greatly increased. Furthermore, highly unusual is the fact that this mechanical strength is greatly increased even when only a micromolecular film of metal coating covers the interstitial surfaces of the carbonaceous material.

Increase in mechanical strength of the carbonaceous-metal heterogeneous body is not the only advantage realized from the incorporation of metal into carbonaceous solid bodies. An unusual increase in thermal conductivity is another advantage which is realized. This increase in thermal conductivity has particular adaptability to carbonaceous heat exchanger equipment. Metals preferred for incorporation in the carbonaceous solid bodies to increase the thermal conductivity thereof are aluminum, beryllium, copper, gold, magnesium, molybdenum, silver, titanium and tungsten.

These heretofore unobtainable heights of mechanical strength and thermal conductivity are achieved in a very economical and simple manner. For example, it is not necessary to employ, as the starting carbonaceous material into which the metal is to be integrated, an extremely high density carbon or graphite material. Lower density materials can be "upgraded" to the desired mechanical and thermal properties with such cheap and easily obtainable metals as, for example, aluminum.

Another advantage of the heterogeneous carbonaceous solid bodies of this invention is the upgrading of electrical properties by the incorporation of a metal into a carbonaceous solid body so that electrical conductivity of the carbonaceous body is significantly increased. Silver, copper, gold, aluminum, calcium, rhodium, magnesium are metals which are especially preferred in increasing the electrical conductivity of carbonaceous solid bodies. It should also be noted that certain semi-conductors such as germanium may also have desirable properties in various electrical environments and are therefore preferred coating materials.

Economical, mechanically strong high performance electrodes can be "tailor-made" for various processing operations by the proper selection of the metallic constituent of the heterogeneous metal-carbon solid body. Here again considerable economical advantage can be realized, since it generally would not be necessary to employ high density, high cost carbonaceous starting materials, but, rather, lower density, lower cost, porous carbon materials could be employed. These low cost carbon materials are then "upgraded" through the process of this invention to the desired conductivity-density relationship. In this latter respect, it should be noted that high density is not necessary for many of the products of this invention. Since metal is incorporated into the carbonaceous structure, conductivity, equal to or better than the best high density, pure carbonaceous structures, can be achieved in a lower density heterogeneous metal-containing carbonaceous structure.

In summary, the heterogeneous solid bodies of this invention are extremely novel materials which find applicability in a multitude of environments requiring high performance electrical, physical, mechanical and chemical properties. By the utilization of the simple and economical processes of this invention, these novel solid bodies can be "tailor-made" for the particular end use held in mind.

Figure 1:
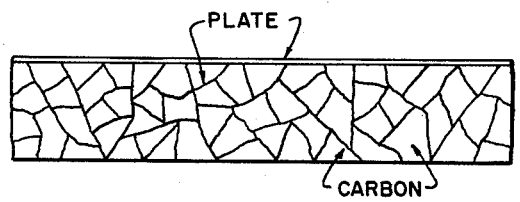
FIGURE 1 illustrates a cross section of a typical form of a metal plated porous carbon solid body on a small scale prepared in accordance with this invention.
Figure 2:
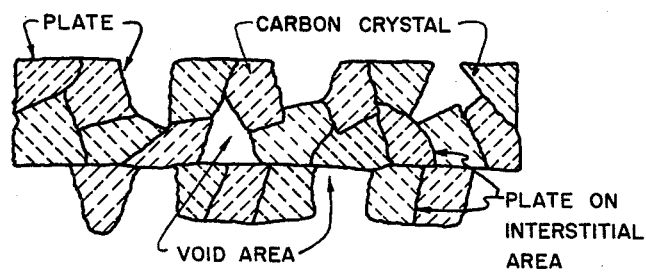
FIGURE 2 illustrates a cross section segment of a meal plated porous carbon solid body on a magnified scale prepared by the process of this invention, especially noting the plate formed in the interstices.

The novel heterogeneous solid bodies of this invention can be produced by decomposition of a metal-containing compound—thermal decomposition being the preferred mode of carrying out the decomposition process. Thus, in general, any prior art technique for metal plating an object by thermal decomposition of the metal-containing compound can be employed as a plating technique. For example, any technique heretofore known for the decomposition and subsequent plating of Group VI–B metals from the hexacarbonyl derivative of those metals can be employed. Illustrative are those techniques described by Lander and Germer, American Institute of Mining and Metallurgical Engineers, Technical Publication No. 2259 (1947). Usually the technique to be employed comprises heating the object to be plated (i.e., the porous carbon solid body) to a temperature above the decomposition temperature of a metal-containing compound and, thereafter, contacting the metal-containing compound with the heated object. The following examples are more fully illustrative of the process of this invention.

In Example I–IV the following technique was used:

Into a conventional heating chamber provided with means for infrared heating and gas inlet and outlet means is placed the porous carbon solid body to be plated. The metal-containing plating agent (i.e., the metallic source for the metal coating) is placed in a standard vaporization chamber provided with heating means, said vaporization chamber being connected through an outlet port to the aforesaid combustion chamber inlet means.

For the plating operation the object to be plated is heated to a temperature above the decomposition temperature of the metal-containing plating agent, the system is evacuated and the metalliferous compound is heated to an appropriate temperature where it possesses vapor pressure of up to about 10 millimeters. In most instances the process is conducted at no lower than 0.01 millimeter pressure. The metal-containing vapors are pulled through the system as the vacuum pump operates and they impinge on the heated object decomposing and forming the metallic coating. In most instances no carrier gas was employed, however, in certain cases a carrier gas can be used to increase the efficiency of the above disclosed plating system. In those cases where a carrier gas is employed, a system such as described by Lander and Germer, page 7, can be utilized. It should be noted that in carrying out the above described thermal decomposition process the porous carbon solid body is heated to a relatively uniform temperature throughout. Thus, the process of this invention is a "controlled" decomposition process wherein the rate of decomposition is such that the vapors of the metal-containing plating agent permeate the interstices of the porous carbon solid body before substantial decomposition of said metal-containing plating agent occurs.

*Example I*

| | |
|---|---|
| Compound | $Cr(CO)_6$. |
| Compound temp. | 50° C. |
| Substrate | ATJ (Natl. Carbon Co.). |
| Substrate temp. | 225° C. |
| Heating method | IR (infrared). |
| Pressure | 1 mm. |
| Time | 2 hours. |
| Result | Bright Cr coating on the surface only. |

*Example II*

| | |
|---|---|
| Compound | $Mo(CO)_6$. |
| Compound temp. | 65° C. |
| Substrate | 50 percent porosity graphite. |
| Substrate temp. | 250° C. |
| Heating method | IR. |
| Pressure | 2.5 mm. |
| Time | 3 hours. |
| Result | Bright Mo coating, complete penetration, porosity retained. |

*Example III*

| | |
|---|---|
| Compound | $W(CO)_6$. |
| Compound temp. | 70° C. |
| Substrate | Grade A graphite (Great Lakes Carbon Co.). |
| Substrate temp. | 275° C. |
| Heating method | IR. |
| Pressure | 0.5 mm. |
| Time | 1½ hours. |
| Result | Bright W coating, mainly on the surface. |

*Example IV*

| | |
|---|---|
| Compound | $CpV(CO)_4$ (cyclopentadienyl vanadium carbonyl). |
| Compound temp. | 90° C. |
| Substrate | Grade W (Graphite Specialties). |
| Substrate temp. | 200° C. |
| Heating method | IR. |
| Pressure | 0.5 mm. |
| Time | 1 hour. |
| Result | Dark grey deposit predominantly on the surface. |

Any metal compound which can be decomposed to deposit a metal can be employed as a metal source in the process of this invention. These metal compounds include inorganic metal compounds such as the metal halides, metal hydrides, metal nitroxyl compounds, metal nitrosyl compounds and the like. Exemplary of metal halides are titanium tetrachloride, beryllium diiodide, aluminum trichloride, titanium tetraiodide, zirconium tetrachloride, halfnium tetrachloride, hafnium tetrabromide, thorium tetraiodide, germanium diiodide, tin dichloride, vanadium diiodide, vanadium trichloride, vanadium tetrachloride, niobium pentachloride, chromium diiodide, molybdenum tetrachloride, rhenium trichloride, vanadium triiodide, tungsten hexachloride, iron trichloride, osmium tetrachloride, and the corresponding fluorine, chlorine, bromine, iodine and astatine derivatives of the aforementioned metals. Generally, temperatures above 1000° C. are utilized to decompose the metal halide plating agents of this invention. Most of these metal halide compounds decompose within a range of about 1000–2000° C.

Exemplary of the metal hydrides, and other compounds, which can be employed are lanthanum trihydride, strontium dihydride, lithium hydride, rubidium hydride, barium dihydride, titanium dihydride, zirconium dihydride, niobium hydride, tantalum hydride, chromium trihydride, molybdenum hydride, tungsten hydride, iron hydrides, cobalt hydrides, nickel hydrides, copper hydride, zinc hydride, diborane, aluminum hydrides, gallium, germanium hydride, tin hydride, antimony hydride, tellurium hydride, the various hydrides of the lanthanum and actinium series. Metal hydrides decompose at temperatures lower than metal halides. Generally, temperatures no higher than 800° can be employed to decompose the various metal hydrides.

The metal compounds of this invention also include organometallics, preferably unsubstituted hydrocarbon metallics, having between about 1 to 20 carbon atoms. These organometallics can be covalently bonded organometallics, such as the metal alkyls. For example, triethylaluminum, triisobutylaluminum, tetraethyllead, diethylmagnesium, diethyltin, aluminum sesquichloride, tetraethyltin, tetraethylsilane, triethylborane, diethylzinc, triphenyl aluminum, aluminum dimethyl hydride, diphenyl magnesium, magnesium methyl hydride, magnesium ethyl sulfide, aluminum trieicosyl, dimethyl aluminum chloride and the like can be employed. Furthermore, these organometallics can be organometallic chelates such as the acetyl acetonates of copper, nickel, platinum, chromium and the like. However, the organometallic compounds of this invention are preferably organometallic coordination compounds—particularly transition metal coordination compounds—such as bis-cyclopentadienyl titanium, cyclopentadienyl manganese tricarbonyl, methyl cyclopentadienyl manganese tricarbonyl, bis-cyclopentadienyl zirconium dichloride, bis-cyclopentadienyl titanium dibromide, dibenzene chrominum, bis-cyclopentadienyl iron, cyclopentadienyl cobalt dicarbonyl, bis(cyclopentadienyl nickel carbonyl), dibenzene molybdenum, dibenzene tungsten, bis(cyclopentadienyl chromium carbonyl), bis(cyclopentadienyl chromium dinitrosyl), cyclopentadienyl titanium tribromide, cyclopentadienyl zirconium trichloride, bis-cyclopentadienyl manganese, bis-cyclopentadienyl nickel. Furthermore, other coordination compounds such as the metal carbonyls find particular applicability in the processes of this invention because of their economic advantages and general ready availability. Representative of these metal carbonyls are nickel tetracarbonyl, iron pentacarbonyl, chromium hexacarbonyl, molybdenum hexacarbonyl, tungsten hexacarbonyl, cobalt tricarbonyl nitrosyl, iron dicarbonyl dinitrosyl, cobalt tetracarbonyl hydride, iron tetracarbonyl dihydride, bis(manganese pentacarbonyl), vanadium carbonyl, and the like. Other carbonyl metal compounds can also be employed, as for example, carbonyl metal halides, carbonyl metal hydrides, such as those illustrated above.

In general, organometallic compounds can be decomposed at relatively moderate temperatures—generally no higher than 500° C. and in many cases as low or lower than 100° C. Furthermore, organometallic compounds, and in particular, organometallic coordination compounds, generally decompose into products which are not harmful to the metal coatings of the heterogeneous solid bodies.

When the decomposition techniques of the processes of this invention comprise thermal decomposition, it is preferable to employ readily decomposable volatile metal-bearing compounds as the metallic source, although, generally, any heat decomposable metal-bearing gases can be employed. The following examples employ the process of Examples I–IV with the exception that the heat means utilized comprise infrared heating and supplementary resistance heating. These examples more fully demonstrate the gaseous heat decomposable metal-bearing compounds which can be employed in the thermal decomposition process of this invention.

*Example V*

Compound _____ $C_2H_4Mg$ (vinyl magnesium hydride).
Compound temp. __ 175° C.
Substrate _____ Porous graphite.
Substrate temp. ___ 300° C.
Pressure _____ 0.5 mm.
Time _____ 2 hours.
Result _____ Fine Mg deposit (air-sensitive).

*Example VI*

Compound _____ $Ge(C_5H_7O_2)_4$ (germanium acetylacetonate).
Compound temp. __ 150° C.
Substrate _____ Type A graphite.
Substrate temp. ___ 375° C.
Pressure _____ 0.1 mm.
Time _____ 1 hour.
Result _____ $GeO_2$ coating.

*Example VII*

Compound _____ $Cu(C_5H_7O_2)_2$ (copper acetyl acetonate).
Compound temp. __ 175° C.
Substrate _____ Type W graphite.
Substrate temp. ___ 400° C.
Pressure _____ 0.1 mm.
Time _____ 2 hours.
Result _____ CuO coating.

*Example VIII*

Compound _____ $(C_6H_6)_2Cr$ (dibenzene chromium).
Compound temp. __ 150° C.
Substrate _____ Porous graphite.
Substrate temp. ___ 420° C.
Pressure _____ 0.2 mm.
Time _____ 3 hours.
Result _____ Bright, metallic coating.

*Example IX*

Compound _____ $Cd(C_2H_5)_2$ (diethyl cadmium).
Compound temp. __ 20° C.
Substrate _____ Porous graphite.
Substrate temp. ___ 150° C.
Pressure _____ 2 mm.
Time _____ ½ hour.
Result _____ Light grey deposit.

*Example X*

Compound _____ $Sc(C_5H_5)_3$ tricyclopentadienyl scandium).
Compound temp. __ 230° C.
Substrate _____ Porous graphite.
Substrate temp. ___ 450° C.
Pressure _____ 0.1 mm.
Time _____ 3 hours.
Result _____ Grey, dull deposit.

*Example XI*

Compound _____ $Ru_2(CO)_9$.
Compound temp. __ 150° C.
Substrate _____ ATJ graphite.
Substrate temp. ___ 225° C.
Pressure _____ 1 mm.
Time _____ 1 hour.
Result _____ Metallic deposit.

*Example XII*

Compound _____ $(C_5H_6)_2Ni$ (dicyclopentadiene nickel).
Compound temp. __ 85° C.
Substrate _____ ATJ graphite.
Substrate temp. ___ 200° C.
Pressure _____ 1.5 mm.
Time _____ 1½ hours.
Result _____ Grey, metallic coating.

*Example XIII*

Compound _____ $Co_2(CO)_8$.
Compound temp. __ 100° C.
Substrate _____ ATJ graphite.
Substrate temp. ___ 250° C.
Pressure _____ 2 mm.
Time _____ 1 hour.
Result _____ Metallic deposit.

Although thermal decomposition is the preferred mode of carrying out the process of this invention, other decomposition techniques can be employed. Thus, the following working example is illustrative of the decomposition of a manganese compound by ultrasonic frequency.

The process employed in Examples I–IV is essentially followed with the exception that an ultrasonic generator is proximately positioned to the plating apparatus. In this example the vapor of the compound is heated to its decomposition threshold, i.e., in the vicinity of 250° C. and thereafter the ultransonic generator is utilized to effect final decomposition.

Example XIV

| | |
|---|---|
| Compound | $CpMn(CO)_3$ (cyclopentadienyl manganese tricarbonyl). |
| Compound temp. | 100° C. |
| Substrate | 10 percent porosity graphite. |
| Substrate temp. | 250° C. |
| Heating method | IR and ultrasonic. |
| Pressure | 1 mm. |
| Result | Metallic deposit, some penetration, predominantly on the surface. |

Another method for decomposing the plating agent of this invention is by decomposition with ultraviolet irradiation. The following example is illustrative of this technique.

The method of Examples I–IV is employed with the exception that the infrared heating means is supplemented with an ultraviolet irradiating means. Thus, in this case, a battery of ultraviolet and infrared lamps are placed circumferentially around the exterior of the heating chamber. The substrate to be heated is brought to a temperature just below the decomposition temperature of the plating agent with the infrared heating and thereafter decomposition is effected with ultraviolet rays.

Example XV

| | |
|---|---|
| Compound | $Cl_3Al_2Et_3$ (ethyl aluminum sesquichloride). |
| Compound temp. | 60° C. |
| Substrate | 25 percent porosity graphite. |
| Substrate temp. | 200° C. |
| Heating method | IR and ultraviolet. |
| Pressure | 1.5 mm. |
| Time | 2 hours. |
| Result | Light grey deposit, pores appear to be completely closed. |

In some instances it is desirable to employ external resistance heating in the process of this invention. The following example is illustrative of this technique. The method of Example XV is employed with the exception that the heating chamber is housed in a resistance furnace rather than being surrounded by a battery of infrared and ultraviolet lamps. For the plating operation the object to be plated is heated to a temperature above the decomposition temperature of the plating agent and thereafter the decomposition is effected.

Example XVI

| | |
|---|---|
| Compound | $Cp_2TiCl_2$ (bis-cyclopentadienyl titanium dichloride). |
| Compound temp. | 150° C. |
| Substrate | 50 percent porosity graphite. |
| Substrate temp. | 450° C. |
| Heating method | External resistance heating. |
| Pressure | 0.1 mm. |
| Time | 4 hours. |
| Result | Dark deposit, large amount of penetration. Some closing of the pores. |

Induction heating is another technique which can be employed in the process of this invention. Thus, the process of Examples I–IV is employed with the exception that the graphite object to be plated is placed into a conventional heating chamber provided with means for high frequency induction heating as opposed to the former process where heating is effected by infrared heating means.

Example XVII

| | |
|---|---|
| Compound | $TiCl_4 + H_2$. |
| Compound temp. | 80° C. |
| Substrate | 80 percent porosity graphite. |
| Substrate temp. | 1100° C. |
| Heating method | Induction with Fe core. |
| Pressure | 2 mm. |
| Time | 3 hours. |
| Result | Dark grey deposit, considerable penetration. |

The porous carbon solid body which comprises the object into which the metal is integrated can be an amorphous carbon solid body or a graphite solid body. Thus, the term "porous carbon solid body" is meant to include both amorphous carbon and graprite shapes.

Generally, these porous carbon bodies have an apparent porosity ranging from about 1–50 percent (apparent porosity as used herein is defined as the volume of open pore space per unit total volume. See Hackh's Chemical Dictionary, 3rd edition, 1944, page 674).

The term "surface" as employed herein is meant to include (1) the exterior surface of the solid body and (2) the apparent or interstitial surface, i.e., that total surface of porous solid body exposed to contact with the vapors of the metal-bearing plating agent.

In general, the metallic coatings which are plated on the surface of the porous carbon solid bodies are of micromolecular thickness. However, when the exterior of said solid body is coated, a coat of considerably greater thickness can be plated thereon depending upon the processing conditions chosen. However, it is generally preferred, for economic reasons, to utilize as thin a coat as sufficient for the plating operation. In general, the thickness of the coats ranges from about 0.01 mil to 50 mils.

It should be noted that when employing the metal-containing plating agents of this invention it is necessary to maintain enough vapor pressure below the decomposition temperature of the plating agent to enable the process to be conducted at an appreciable rate of plating. Too high vapor pressure results in poor substrate adherence. Thus, it is preferred to employ up to about 10 mm. pressure during the plating operation—preferably 0.01 to 10 mm. pressure.

Temperatures are very important in obtaining the desired product. Thus, although temperatures above the decomposition temperature of the metal containing compound can in general be employed in the process of this invention, a preferred temperature generally exists for each plating agent. When this temperature is employed better plating results can be obtained.

Although the plating compounds of the present invention vary insofar as their thermal stability is concerned, they can generally be decomposed at a temperature above 400° C., and some at much lower temperatures, such as 100° C. With the exception of the inorganic metal halides, such as titanium tetrachloride and the like, temperatures no higher than 700° C. and, preferably, no higher than 500° C. are generally employed. When inorganic metal halides are employed, temperatures ranging from about 1000 to about 2000° C. can be used.

The metal-carbon heterogeneous solid bodies produced in this invention find a multitude of uses, particularly in aircraft, missile and chemical processing industries. Thus, aircraft and missile components which require ultra high quality performance characteristics involving high strength, excellent resistance to high temperatures and chemical attack are some of the applications for these materials. More specifically, the products of this invention find application as rocket nozzles, bearings and rocket guidance fins.

In the chemical processing industry, the products produced by this invention find use in equipment subjected to high temperatures and chemical attack—as for example, heat exchangers employed in such an environment. Furthermore, such materials as chromium, molybdenum, zirconium, niobium or vanadium heterogeneous graphite solid bodies find particular utility for encapsulation of nuclear reactor fuel elements. By encapsulating nuclear reactor fuel elements in heterogeneous solid "containers, escape of highly dangerous radio active fission by-products is conveniently prevented. The heterogeneous metal-carbonaceous solid bodies of this invention wherein the metal is a metal having excellent electrical properties provide excellent electrodes for various electrolytic processing techniques.

Thus, having fully described the novel products of the present invention, modes for their preparation and methods for their employment, we do not intend that our invention be limited except as within the spirit and scope of the appended claims.

We claim:

1. A process for the preparation of a heterogeneous metal plated graphite body which process comprises:
    (1) heating a porous graphite body having an apparent porosity ranging from 1 to about 50 percent to a temperature of from about 400° C. to about 700° C.,
    (2) contacting said heated porous graphite body with the vapors of a Group VI–B metal hexacarbonyl compound in a non-oxidizing atmosphere to coat the interstitial surface areas defining the pores of the graphite body, and
    (3) continually contacting the heated graphite body with said compound in a non-oxidizing atmosphere to effect thereon a coating ranging from about 0.01 to about 50 mils thick.

2. The process of claim 1 further characterized in that said Group VI–B metal hexacarbonyl compound is tungsten hexacarbonyl and said process is conducted at a pressure within the range of from about 0.01 to about 10 millimeters of mercury absolute.

References Cited in the file of this patent

UNITED STATES PATENTS

| | | |
|---|---|---|
| 1,049,979 | Becket | Jan. 7, 1913 |
| 2,200,846 | Lattmann | May 14, 1940 |
| 2,602,033 | Lander | July 1, 1952 |
| 2,698,812 | Schladitz | Jan. 4, 1955 |
| 2,913,357 | Ostrofsky et al. | Nov. 17, 1959 |
| 2,995,471 | Gurinsky | Aug. 8, 1961 |

FOREIGN PATENTS

| | | |
|---|---|---|
| 6,104 | Great Britain | Sept. 28, 1889 |

OTHER REFERENCES

Powell et al.: Vapor-Plating, pp. 24–70, Wiley & Sons, New York, 1955.